May 23, 1967  H. A. MACKIE ETAL  3,321,038
AIR CUSHION DEVICE

Original Filed Jan. 25, 1960  2 Sheets-Sheet 1

INVENTORS
Harry A. Mackie &
BY Robert W. Veryzer

W. F. Wagner
ATTORNEY

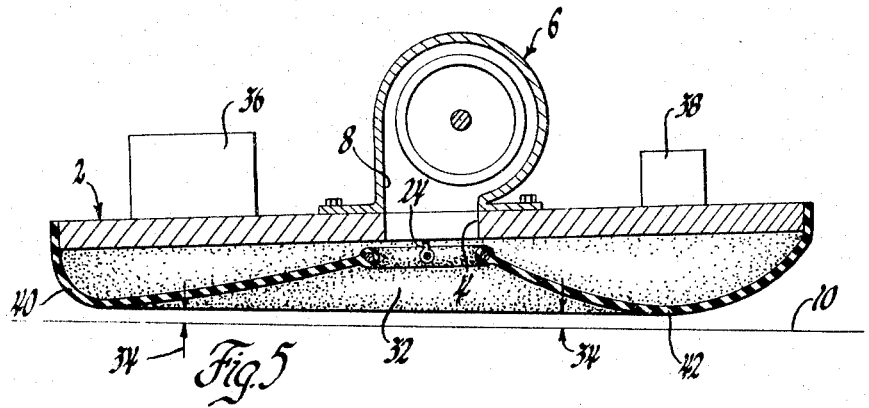
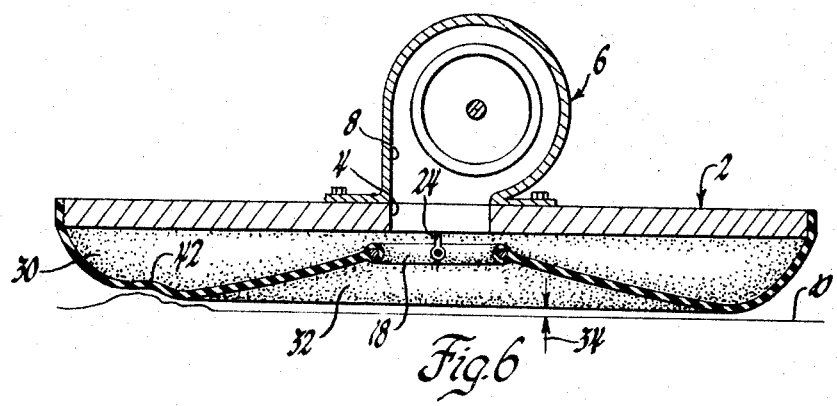
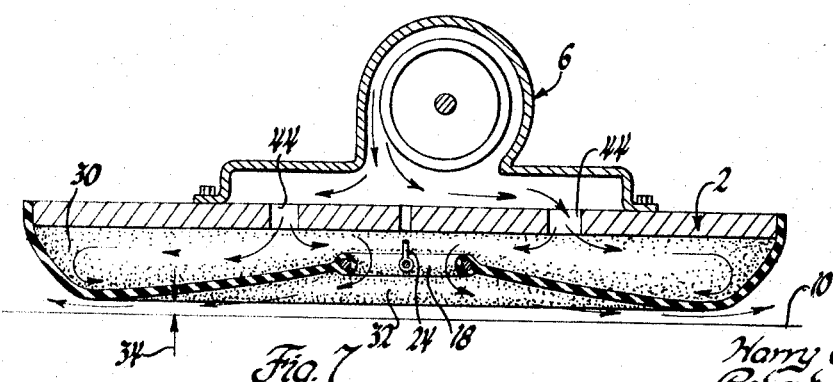

United States Patent Office

3,321,038
Patented May 23, 1967

3,321,038
AIR CUSHION DEVICE
Harry A. Mackie and Robert W. Veryzer, both of Birmingham, Mich., assignors to General Motors Corporation, Detroit, Mich., a corporation of Delaware
Continuation of application Ser. No. 4,465, Jan. 25, 1960.
This application Jan. 19, 1966, Ser. No. 526,943
5 Claims. (Cl. 180—7)

This application is a continuation of abandoned application Ser. No. 4,465, filed Jan. 25, 1960, in the names of Harry A. Mackie and Robert W. Veryzer, entitled, "Air Cushion Device," and assigned to the assignee of the present invention.

This invention relates to wheelless load supporting devices and more particularly to vehicles which are supported relative to the ground solely by means of a low pressure free air cushion.

Very recently, considerable effort has been directed toward developing practical wheelless passenger and cargo carrying vehicles which utilize the so-called "ground cushion phenomenon" as the sole means for supporting the vehicle relative to the ground. Among the various known forms of load supporting devices which are considered within the meaning of the term "ground cushion" are low pressure air bearings and plenum chambers. In the former, a platform having a flat lower surface is provided with a central aperture through which air is introduced from a low pressure high volume source. This air radiates outwardly from the aperture between the lower surface of the platform and the supporting surface forming a thin layer of air lubricant which supports the platform in the frictionless spaced relation from the supporting surface. In the latter, the platform is inverted cup shape in form providing a permanent cavity facing the supporting surface. Air in introduced in the same manner as the air bearing but forms a relatively large volume cushion within the cavity rather than the thin layer characteristic of the air bearing. While both of the foregoing have certain fundamental characteristics in common, air bearings differ significantly from plenum chambers in that the former operate most efficiently when clearance between the lower surface of the vehicle and the ground is on the order of 5 to 10 thousandths of an inch. By contrast, vehicles utilizing a plenum chamber normally function at an elevation above the ground approximately 5% of the diameter of the plenum chamber.

Although the low pressure air bearing is extremely simple structually, it exhibits very low tolerance to load unbalance. In addition, the very shallow clearance or spacing between the ground and supported platform characteristic of this form severely limits the possibility of practical application thereof since any vehicle so supported would be unable to negotiate even moderate irregularities on the surface over which it was intended to travel.

Plenum chambers on the other hand possess greater capability in clearing surface obstacles due to their higher normal operating clearance. However, in common with the low pressure air bearing, the plenum chamber exhibits a marked tendency to "ground out" if subjected to moderate load unbalance. It has already been proposed to improve the obstacle clearing ability of plenum chambers by providing such vehicles with a depending flexible peripheral skirt which would yieldably deflect when an obstacle was encountered. While this expedient achieves some success insofar as obstacle clearing is concerned, it accomplishes little if anything in terms of improved stability under conditions of unbalanced load.

An object of the present invention is to provide an air cushion supported vehicle which is capable of surmounting substantial irregularities on the surface over which it travels while providing a high degree of tolerance to load unbalance.

Another object is to provide an air cushion supported vehicle wherein a substantially flat platform has disposed thereunder and secured to the perimeter thereof a flexible diaphragm having a central aperture, the diaphragm and platform forming an annular cavity which is subjected to air pressure of the same level as the air pressure forming the air cushion between the vehicle and the ground.

A further object is to provide an air cushion supported vehicle having a flat platform and a downwardly bulged flexible undersurface forming a pressurized cavity, the undersurface being capable of deflectively enveloping road surface obstacles without causing an increase in pressure in the pressurized cavity.

A still further object is to provide a device of the stated character wherein the central aperture in the diaphragm is capable of adjustable positioning in any of a plurality of vertical positions above the lowermost extremity of the diaphragm when the latter is inflated so as to provide a plenum cavity of generally frusto-conical shape between the lower surface of the diaphragm and the adjacent ground which is occupied by low pressure air acting to support both the platform and diaphragm above the ground at a vertical level providing moderate clearance between the ground and the lowermost extremity of the diaphragm.

Yet another object is to provide a device of the stated character in which the profile of the flexible undersurface automatically changes so as to shift the location of the plenum cavity horizontally in a direction counteracting the unbalanced load applied to the platform.

These and other objects, advantages, and features of the invention will become more fully apparent as reference is had to the accompanying specification and drawings wherein:

FIGURES 3, 4, 5 and 6 are views similar to FIGURE 2 illustrating functional characteristics of the device under various conditions of operation; and FIGURE 7 is a modified form of the invention shown in FIGURE 2.

Figure 2:
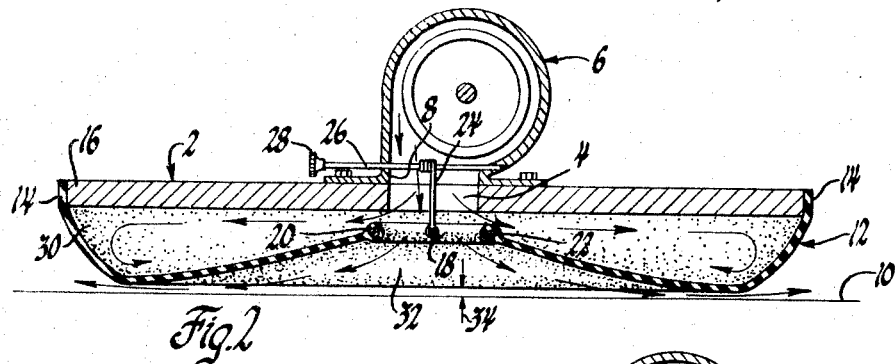
FIGURE 2 is a diagrammatic view illustrating the form and arrangement of a load supporting device according to the invention.

Referring now to the drawings and particularly FIGURE 2, there is shown a load supporting device in which the reference numeral 2 designates a thin rigid flat platform having a central opening 4 formed therein. Disposed over opening 4 and secured to the upper surface of platform 2 is a low pressure high volume air source, which in the illustrated embodiment, takes the form of a centrifugal blower 6, having a discharge end 8 which is axially aligned with opening 4. Blower 6 may be driven by any suitable source of power such as a gasoline engine, battery powered electric motor, or the like. It will be understood that the invention is not limited to the particular type of blower shown, any other known form of low pressure high volume air delivery being equally suitable and within the contemplation of the invention.

The structure thus far described is already well known in the art as a low pressure air bearing which, when blower 6 is operated, rises above the ground 10 a few thousandths of an inch so that a constantly moving thin layer of air lubrication exists between the lower surface of the platform and the ground. It is also known that the structure thus far described exhibits the ability to support extremely heavy loads in terms of power expended while maintaining the platform in frictionless spaced relation from the ground. However, in heretofore known forms, air bearing platforms have required an exceedingly smooth surface upon which to operate, owing to the extremely shallow clearance. In addition, such devices functioned properly only if the supported load was very carefully balanced with reference to the center of gravity of the platform.

Figure 3:
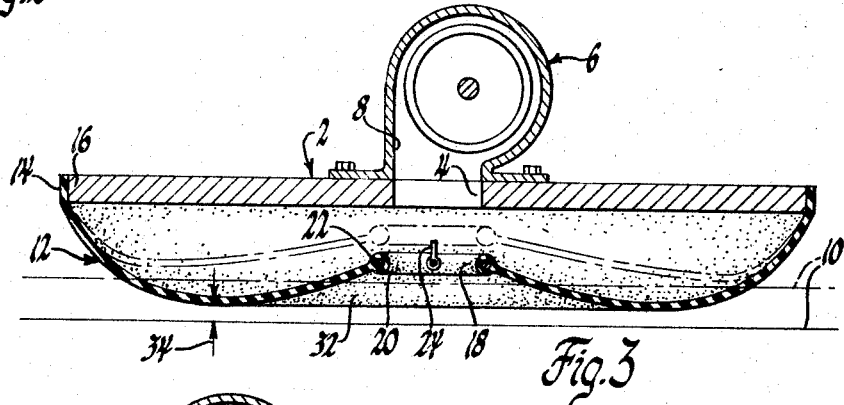

To overcome the foregoing shortcomings in accordance with the present invention, platform 2 has disposed thereunder a preformed flexible diaphragm element 12, the outer periphery or margin 14 of which is secured in air tight engagement with the perimeter 16 of the platform. As seen best in FIGURE 2, the preformed shape of diaphragm element 12 is such that the cross-sectional dimension of the essentially horizontally extending portion thereof disposed in juxtaposed relation to support surface 10 is at least three times that of the essentially vertically extending portion disposed in radially confronting relation to atmosphere. Although shown relatively thick for clarity, diaphragm 12 is preferably formed of a thin, tough, stretch resistant material such as the polyester reaction product of terephthalic acid and ethylene glycol known as "Mylar." Centrally thereof, diaphragm 12 is formed with a circular throat or aperture 18 which is axially aligned with aperture 4 in platform 2. Aperture 18 is preferably bounded by a bead 20 having a metal ring 22 embedded therein. Ring 22 is attached to one end of a flexible cable 24, the other end of which is connected to a rotatable control rod 26 mounted in blower 6. By manipulation of a knob 28, cable 24 winds and unwinds on rod 26, thereby permitting selection of various vertical operating levels of ring 22 relative to platform 2 (FIGURE 3).

Figure 4:
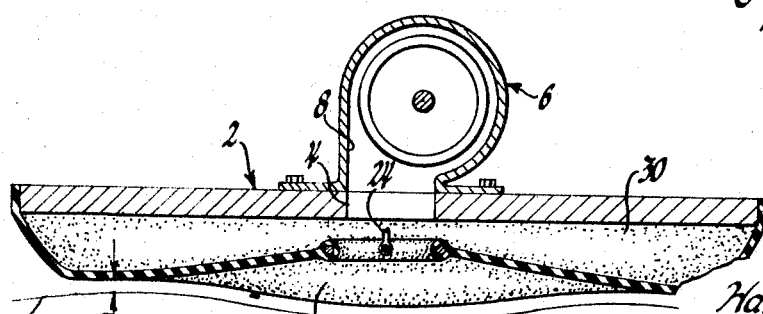

Operation of the structure shown in FIGURE 2 is as follows: (it will be understood that prior to operation of blower 6, diaphragm 12 will be in a collapsed condition between platform 12 and the supporting surface 10). Upon energization of blower 6, air enters the inlet thereof (not shown) and is compressed to a suitable pressure, e.g,. 11 lbs. per square foot, and ejected from the discharge end 8 through opening 4 to the undersurface of platform 2. From opening 4, air enters the initially collapsed cavity 30 formed between the undersurface of the platform and the top surface of the diaphragm. Because of the attachment of margin 14 of the diaphragm at the perimeter of the platform, the pressurized air thus introduced cannot escape from cavity 30 except through throat 18, which is occupied by continuously flowing air at the same pressure, hence the diaphragm will initially inflate and lift the platform vertically. After sufficient pressurized air has entered cavity 30 to inflate the diaphragm and support the platform, further discharge of pressurized air from blower 6 is required to pass through throat 18 into the frusto-conical cavity 32 created between the underside or horizontally extending portion of the diaphragm and the supporting surface 10 as a result of inflation of cavity 30. The pressurized air thus introduced into cavity 32 thereafter functions to provide an air cushion supporting the diaphragm and the platform in frictionless relation to the supporting surface in essentially the same manner as accompained by a conventional plenum chamber. It will be noted that during operation the diaphragm 12 assumes an annular convolution or configuration defining a narrow annular zone of circular clearance 34 relative to support surface 10 at the outer extremity of plenum cavity 32 which is relatively shallow in vertical extent. This narrow annular zone of shallow clearance functions to meter or throttle the rate of escape of air from plenum cavity 32 so as to maintain pressurized air therein equal to the delivery rate of blower 6. Since the pressure in cavity 30 is substantially equal to the pressure in cavity 32, a negligible pressure differential exists therebetween while a substantial pressure differential exists between cavity 30 and atmospheric pressure radially outwardly of the narrow annular zone of clearance 34. Therefore, the vertically extending portion of the diaphragm between clearance 34 and outer margin 14 defines a continuously curving cross-section or radius, while, as previously stated, the underside or horizontally extending portion of the diaphragm defines a generally conical cross-section. Uniformity of the vertical extent of clearance 34 is constantly maintained by automatic change in the profile configuration of the diaphragm due to pressure exerted on the inner wall thereof by pressurized air in cavity 30. As a result, should the device be negotiating an undulating surface such as shown in FIGURE 4, the diaphragm similarly automatically adjusts to the adjacent surface undulation and maintains the uniform circular clearance 34.

Because pressurized air in cavity 30 automatically adjusts the diaphragm profile so that its lowest extremity maintains uniform clearance with supporting surface, a device according to the invention possesses the ability to continue functioning efficiently even though a load is imposed thereon which substantially unbalances the center of gravity of the vehicle. As illustrated in FIGURE 5, if load is distributed unevenly as in the form of heavy weight 36 on the left and a light weight 38 on the right, platform 2 will tilt downwardly on the side supporting the heavier weight. However, the portion of diaphragm 12 located on the more heavily weighted side assumes a profile or cross-sectional configuration wherein the vertically extending portion between clearance 34 and outer periphery 14 forms a small radius 40 while the lightly weighted side rises allowing the vertically extending portion of the diaphragm at that side to assume a profile configuration of much larger radius 42. Naturally, cross-sectional radii taken along the circumference of the diaphragm between radius 40 and radius 42 will vary progressively between the two extremes. As will be evident from the drawing, the result of the differing radii is that the clearance 34 is still maintained uniformly vertically, but the lateral position of the circle defined by clearance 34 is shifted in the direction of the more heavily weighted side. Thus, in effect, the air cushion support area automatically adjusts itself horizontally to achieve realignment with the modified center of gravity of the vehicle together with its maldistributed weight. As an adjunct further assisting the horizontal translation of the air cushion, it will be seen that cable 24 suspending ring 22 is free to swing laterally and thus allow limited lateral physical displacement of the central portion of the diaphragm 12 relative to platform 2.

FIGURE 6 illustrates schematically the behavior of the diaphragm when the vehicle encounters a localized projection or irregularity which is to be progressively traversed by the vehicle. In such case, a localized area 43 of the diaphragm deflects upwardly to maintain a vertical clearance substantially equal to the continuous circular clearance 34 normally present. It is to be particularly noted that upward bulging or deflection of a localized portion of the diaphragm does not increase the level of pressure in cavity 30, since the volume of air so displaced is free to exit through throat 18. Lack of resistance to localized upward deflection of diaphragm 12 is further explained by the fact that the pressure level in cavity 30 and plenum cavity 32 are substantially equal. Because of the ready displacement of air from cavity 30 upon encountering a localized obstacle, the vehicle negotiates such obstacles without perceptible bounce.

Figure 1:
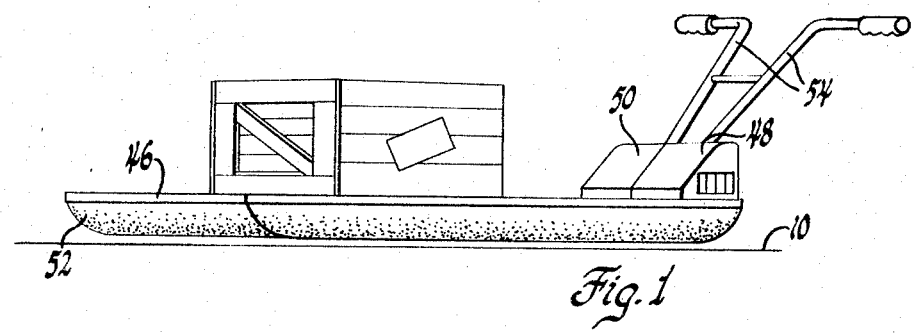
FIGURE 1 is a perspective view of a materials handling vehicle utilizing the present invention.

In FIGURE 7, there is illustrated a modified form of the invention in which the platform 2 is provided with a plurality of openings 44 which allow admission of air from blower 6 directly into the cavity 30 radially outboard of throat 18 and thereby eliminate any possibility of failure of the diaphragm to inflate when the vehicle has been started from a collapsed position. It is to be noted that the specific location of openings 44 is not in any sense critical and may be even further outboard as for example at the outermost extremity of the platform perimeter. Because of this extreme flexibility in location of the pressurized air inlet, the invention is extremely well adapted for use in devices such as the pallet type materials handling truck shown in FIGURE 1. In the form shown in FIGURE 1, the platform 46 is preferably rectangular in form and a blower or compressor 48 and power supply 50 are located at the extreme end thereof to provide a maximum of unobstructed load supporting surface. Naturally, the diaphragm 52 will be preformed to conform to the rectangular form of the platform. However, operationally, the truck shown in FIGURE 1 functions in the same manner as described with respect to FIGURES 2 and 7. Inasmuch as the materials handling truck is devoid of any frictional contact with the ground when in operation, propelling thereof from one location thereof to another is virtually effortlessly accomplished manually by means of guide handles 54. It is to be understood, however, that the invention is not in any sense limited to application requiring manual propulsion, this form being shown for illustrative purposes only.

From the foregoing it will be seen that a novel and improved load supporting vehicle has been provided. It is to be particularly noted that a structure according to the invention is unusually well suited for use in the materials handling field since it is virtually effortlessly propelled in a straight line in any direction from a given point. Hence, the complicated and expensive steering apparatus commonly required to provide wheeled materials handling vehicles with sufficient maneuverability is totally eliminated. In addition to the above, a materials handling truck utilizing the present invention has the additional advantage of offering an extremely low profile when not in operation, thereby greatly reducing difficulty in loading of materials to be transferred.

While several embodiments of the invention have been shown and described, it will be apparent that other changes, modifications, and applications thereof may be made. It is, therefore, to be understood that it is not intended to limit the invention to the embodiments shown, but only by the scope of the claims which follow.

We claim:

1. A ground proximate air cushion device comprising, a platform, a diaphragm underlying said platform and fixed thereto at its outer and inner margins defining an annular depending convolution approaching contact with the ground at a narrow annular zone between the margins, means for supplying air at superatmospheric pressure within the convolution, means for establishing and maintaining corresponding pressure in the space between the diaphragm and the ground surface radially within the narrow annular zone and flowing with throttling through the said zone whereby the diaphragm is subject to a first significant pressure differential between supplied air pressure and atmospheric pressure radially outwardly of the zone and a second negligible pressure differential between supplied air pressure at opposite sides thereof radially inwardly of the zone, said first pressure differential acting to induce a substantially circular cross-sectional curvature in said convolution from the outer margin to said narrow annular zone, and said first and second pressure differentials coacting to permit the former to radially tension the portion of said convolution within said zone into a substantially conical cross-section.

2. The structure set forth in claim 1 wherein the diaphragm central portion is connected to said platform in a manner enabling limited lateral movement relative to said platform.

3. The structure set forth in claim 1 wherein the projected apex of said frusto-conical section lies beneath the upper surface of said platform.

4. A ground proximity fluid cushion supporting device comprising, a platform, a flexible diaphragm disposed horizontally beneath said platform, said diaphragm including a peripheral portion hermetically attached to said platform, an intermediate annular portion defining a continuously curving depending convolution spaced from said platform progressing from the perimeter to a narrow annular zone approaching contact with the ground and a dished central portion connected centrally thereof to said platform above the lowermost extremity of said convolution thereby forming an inflatable annular cavity between said diaphragm and said platform and plenum cavity said diaphragm and the ground, the latter cavity being bounded by a perimetrical throttling gap formed between the lowermost extremity of said convolution and the ground, means for introducing fluid under pressure directly into one of said cavities, and means for establishing and maintaining equal fluid pressure in said cavities, the cross-sectional radius of said continuously curving convolution progressively decreasing when said platform descends in parallel relation to the ground and progressively increasing when said platform ascends in parallel relation to the ground.

5. The invention set forth in claim 4 wherein the cross-sectional radius varies progressively around the circumference of said convolution from an increased to a decreased condition when said platform is inclined relative to the ground whereby said perimetrical throttling gap is caused to shift laterally relative to said platform in the direction of said decreased cross-sectional radius.

No references cited.

A. HARRY LEVY, *Primary Examiner.*

UNITED STATES PATENT OFFICE
CERTIFICATE OF CORRECTION

Patent No. 3,321,038 May 23, 1967

Harry A. Mackie et al.

It is hereby certified that error appears in the above numbered patent requiring correction and that the said Letters Patent should read as corrected below.

Column 1, line 36, for "in", first occurrence, read -- is --; column 3, line 58, for "accompained" read -- accomplished --; column 4, line 14, after "with" insert -- the --; column 6, lines 28 and 29, for "and plenum cavity" read -- and a plenum cavity between --.

Signed and sealed this 28th day of November 1967.

(SEAL)
Attest:

Edward M. Fletcher, Jr.
Attesting Officer

EDWARD J. BRENNER
Commissioner of Patents